US008396307B2

(12) United States Patent
Nakagami et al.

(10) Patent No.: US 8,396,307 B2
(45) Date of Patent: Mar. 12, 2013

(54) IMAGE PROCESSING SYSTEM, IMAGE PROCESSING METHOD AND PROGRAM

(75) Inventors: Ohji Nakagami, Tokyo (JP); Kazushi Sato, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 777 days.

(21) Appl. No.: 11/996,720

(22) PCT Filed: Jul. 25, 2006

(86) PCT No.: PCT/JP2006/314639
§ 371 (c)(1),
(2), (4) Date: Mar. 1, 2010

(87) PCT Pub. No.: WO2007/013437
PCT Pub. Date: Feb. 1, 2007

(65) Prior Publication Data
US 2010/0142835 A1   Jun. 10, 2010

(30) Foreign Application Priority Data
Jul. 25, 2005 (JP) ................. 2005-214494

(51) Int. Cl.
*G06K 9/36* (2006.01)
(52) U.S. Cl. .......... 382/233; 382/232; 382/260

(58) Field of Classification Search .............. 382/232, 382/233, 150, 260, 268; 358/426.01; 348/409.1, 348/E13.019; 375/240.03, 240.02, E7.14, 375/E7.19
See application file for complete search history.

(56) References Cited

U.S. PATENT DOCUMENTS 5,454,051 A * 9/1995 Smith .......................... 382/233
6,167,157 A   12/2000 Sugahara
(Continued)

FOREIGN PATENT DOCUMENTS

JP   2001-078187   3/2001
(Continued)

OTHER PUBLICATIONS

Information technology—Coding of audio-visual objects—Part 10: Advance Video Coding. International Standard, Second Edition Oct. 1, 2004, pp. 149-158.

(Continued)

*Primary Examiner* — Anh Hong Do
(74) *Attorney, Agent, or Firm* — Finnegan, Henderson, Farabow, Garrett & Dunner, L.L.P.

(57) ABSTRACT

There is provided an image processing system and an image processing method able to suppress block distortion in the case of decoding image data encoded in unit of blocks. A controlling unit selects a filtering content to be applied to the block image data based on the encoding types of the block image data to be filtered, and a filtering unit applies filtering to the block image data to be processed according to the filtering content selected by the controlling unit.

20 Claims, 14 Drawing Sheets

U.S. PATENT DOCUMENTS

| | | | |
|---|---|---|---|
| 6,222,881 B1 * | 4/2001 | Walker | 375/240.03 |
| 7,099,389 B1 | 8/2006 | Yu et al. | |
| 7,388,996 B2 * | 6/2008 | Lainema et al. | 382/260 |
| 7,620,261 B2 * | 11/2009 | Chiang et al. | 382/260 |
| 7,778,480 B2 * | 8/2010 | Huang et al. | 382/268 |
| 2004/0062310 A1 | 4/2004 | Xue et al. | |
| 2004/0076237 A1 | 4/2004 | Kadono et al. | |

FOREIGN PATENT DOCUMENTS

| | | |
|---|---|---|
| JP | 2001-224031 | 8/2001 |
| JP | 2001-346207 | 12/2001 |
| JP | 2003-179921 | 6/2003 |
| JP | 2004-180248 | 6/2004 |
| JP | 2005-033411 | 2/2005 |
| JP | 2006-509444 | 3/2006 |

OTHER PUBLICATIONS

P. List et al., "Adaptive Deblocking Filter", IEEE Transactions on Circuits and Systems for Video Technology, vol. 13, No. 7, pp. 614-619 (2003).

Supplementary European Search Report issued Feb. 15, 2011, in Munich, in corresponding EP 06 78 1551.

Communication pursuant to Article 94(3) EPC issued May 25, 2012, in the European Patent Office in corresponding European Application No. EP 06 781 551.4.

* cited by examiner

| Condition | Bs |
|---|---|
| EITHER p OR q BELONGS TO INTRA-MACRO BLOCK AND IS LOCATED AT MACRO BLOCK BOUNDARY. | Bs=4 (STRONGEST FILTERING) |
| EITHER p OR q BELONGS TO INTRA-MACRO BLOCK, BUT IS NOT LOCATED AT MACRO BLOCK BOUNDARY. | Bs=3 |
| NEITHER p NOR q BELONGS TO INTRA-MACRO BLOCK, AND EITHER HAS TRANSFORM COEFFICIENT. | Bs=2 |
| NEITHER p NOR q BELONGS TO INTRA-MACRO BLOCK AND NEITHER HAS TRANSFORM COEFFICIENT, BUT REFERENCE FRAMES ARE DIFFERENT, NUMBERS OF REFERENCE FRAMES ARE DIFFERENT, OR MV VALUES ARE DIFFERENT. | Bs=1 |
| NEITHER p NOR q BELONGS TO INTRA-MACRO BLOCK AND NEITHER HAS TRANSFORM COEFFICIENT, AND ALSO REFERENCE FRAMES AND MV VALUES ARE THE SAME. | Bs=0 (NO FILTERING) |

FIG. 7

| indexA (for α) or indexB (for β) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

| indexA (for α) or indexB (for β) | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

TABLE1

FIG. 8

| bS | \ indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|---|
| bS = 1 | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS = 2 | | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS = 3 | | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

| bS | \ indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|---|
| bS = 1 | | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bS = 2 | | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bS = 3 | | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

TABLE2

IMAGE PROCESSING SYSTEM, IMAGE PROCESSING METHOD AND PROGRAM

TECHNICAL FIELD

The present invention relates to an image processing system, an image processing method, and a program, for decoding encoded image data.

BACKGROUND ART

In recent years, systems (methods) based on the MPEG (Moving Picture Experts Group) and other schemes handling image data as digital and compressing the data by an orthogonal transform such as a discrete cosine transform (DCT) and motion compensation by utilizing redundancy inherent to image information for the purpose of high efficiency transfer and storage of information at that time are now spreading in both distribution of information by broadcasting stations etc. and reception of information in general homes.

The encoding scheme called the "H.264/AVC (Advanced Video Coding)" which is followed the MPEG 2, 4 schemes is being proposed.

An encoding system of the H.264/AVC applies de-block filtering to reconfigured image data in predictive encoding based on block boundary strength data Bs obtained from the image data to be encoded and a quantization parameter QP so as to generate reference image data used for the next predictive encoding. The de-block filtering is processing for suppressing block distortion occurring due to performing for example DCT processing in units of 4×4 blocks.

Further, the above H.264/AVC encoding system (method) adds the block boundary strength data Bs and the quantization parameter QP to the encoded data.

The H.264/AVC decoding system applies de-block filtering to the reconfigured image data based on the block boundary strength data Bs and the quantization parameter QP added to the encoded data.

DISCLOSURE OF THE INVENTION

Problem to be Solved by the Invention

Note that even in decoding systems other than the H.264/AVC such as the MPEG 2, 4 for decoding the encoded data generated by performing orthogonal transform processing such as DCT processing in units of blocks, there are demands to perform the above de-block filtering in order to suppress block distortion.

However, the encoded data determined to be decoded by such a decoding system does not include the above block boundary strength data Bs and quantization parameter QP. The decoding system cannot perform the de-block filtering, the block distortion remains, and the quality of the decoded image ends up falling.

An object of the present invention is to provide an image processing system, an image processing method and a program, able to suppress block distortion even in a case of decoding an encoded image data generated in unit of blocks and to which information for defining a filtering content is not added.

Means for Solving the Program

According to an embodiment of the present invention, there is provided an image processing system for decoding an encoded image data having a plurality of block encoded image data which are generated from a plurality of block image data by encoding types defined in the respective block image data, the image processing system including: a controlling unit configured to select a filtering content to be applied to the block image data based on the encoding types of the block image data to be filtered; and a filtering unit configured to apply filtering to the block image data to be processed according to the filtering content selected by the controlling unit.

Further, according to an embodiment of the present invention, there is provided an image processing system for decoding an encoded image data having a plurality of block encoded image data which are generated from a plurality of block image data by encoding types defined in the respective block image data, the image processing system including: a controlling means for selecting a filtering content to be applied to the block image data based on the encoding types of the block image data to be filtered; and a filtering means for applying filtering to the block image data to be processed according to the filtering content selected by the controlling means.

According to an embodiment of the present invention, there is provided an image processing system for decoding an encoded image data having a plurality of block encoded image data which are generated from a plurality of block image data by encoding types defined in the respective block image data, the image processing system including: a reversible decoding circuit configured to reversibly decode the block image data of the encoded image data to be decoded, an inverse quantization circuit configured to inversely quantize the block image data reversibly decoded by the reversible decoding circuit, an inverse orthogonal transform circuit configured to inversely orthogonal transform the block image data inversely quantized by the inverse quantization circuit, an adder circuit of generating reconfigured image data based on the block image data generated by the inverse orthogonal transform circuit and predictive image data, a controlling unit configured to select a filtering content to be applied to the block image data based on the encoding type of the block image data to be processed, and a filtering unit configured to apply filtering to the reconfigured image data generated by the adder circuit according to the filtering content selected by the controlling unit.

Further, according to an embodiment of the present invention, there is provided an image processing system for decoding an encoded image data having a plurality of block encoded image data which are generated from a plurality of block image data by encoding types defined in the respective block image data, the image processing system including: a reversible decoding means for reversibly decoding the block image data of the encoded image data to be decoded, an inverse quantization means for inversely quantizing the block image data reversibly decoded by the reversible decoding means, an inverse orthogonal transform means for inversely orthogonal transforming the block image data inversely quantized by the inverse quantization means, an adder means for generating reconfigured image data based on the block image data generated by the inverse orthogonal transform means and predictive image data, a controlling means for selecting a filtering content to be applied to the block image data based on the encoding type of the block image data to be processed, and a filtering means for applying filtering to the reconfigured image data generated by the adder means according to the filtering content selected by the controlling means.

According to an embodiment of the present invention, there is provided an image processing method for decoding an encoded image data having a plurality of block encoded image data which are generated from a plurality of block image data by encoding types defined in the respective block image data, the image processing method including: a first step of selecting a filtering content to be applied to the block image data based on the encoding type of the block image data to be filtered, and a second step of applying filtering to the block image data to be processed according to the filtering content selected in the first step.

According to an embodiment of the present invention, there is provided a program to be run by a computer for decoding an encoded image data generated from a plurality of block image data by encoding types defined in the respective block image data, the program making the computer execute: a first routine of selecting a filtering content to be applied to the block image data based on the encoding type of the block image data to be filtered; and a second routine of applying filtering to the block image data to be processed according to the filtering content selected in the first routine.

Effect of the Invention

According to the present invention, an image processing system, an image processing method and a program, able to suppress block distortion even in the case of decoding image data encoded in unit of blocks and to which information for defining the content of filtering is not added can be provided.

BRIEF DESCRIPTION OF THE DRAWINGS

FIG. 5 is a diagram for explaining the processing of a de-block filter shown in FIG. 2 and FIG. 3.

FIG. 7 is a diagram for explaining table data TABLE1 used for acquiring parameters α and β by the DEB control circuit shown in FIG. 6.

FIG. 8 is a diagram for explaining table data TABLE2 used for acquiring data Tc0 by the DEB control circuit shown in FIG. 6.

LIST OF REFERENCES

1 . . . communication system, 2 . . . encoding system, 3 . . . decoding system, 10 . . . MPEG2 decoding system, 12 . . . AVC decoding system, 30 . . . storage buffer, 31 . . . reversible decoding circuit, 32 . . . inverse quantization circuit, 33 . . . inverse orthogonal transform circuit, 34 . . . adder circuit, 35 . . . flame memory, 36 . . . motion prediction/compensation circuit, 37 . . . intra-prediction circuit, 38 . . . picture rearrangement buffer, 39 . . . storage buffer, 41 . . . D/A conversion circuit, 47 . . . de-block filter, 50 . . . storage buffer, 51 . . . reversible decoding circuit, 52 . . . inverse quantization circuit, 53 . . . inverse orthogonal transform circuit, 54 . . . adder circuit, 55 . . . frame memory, 56 . . . motion prediction/compensation circuit, 57 . . . intra-prediction circuit, 58 . . . picture rearrangement buffer, 81 . . . α·β acquisition unit, 82 . . . index calculation unit, 83 . . . tc0 acquisition unit, 84 . . . filtering unit.

DESCRIPTION OF THE PREFERRED EMBODIMENTS

First Embodiment

Below, an image data communication system including an encoding system and a decoding system of an embodiment of the present invention will be explained.

First, the relationship between the configuration of the present embodiment and the configuration of the present invention will be explained.

Figure 2:
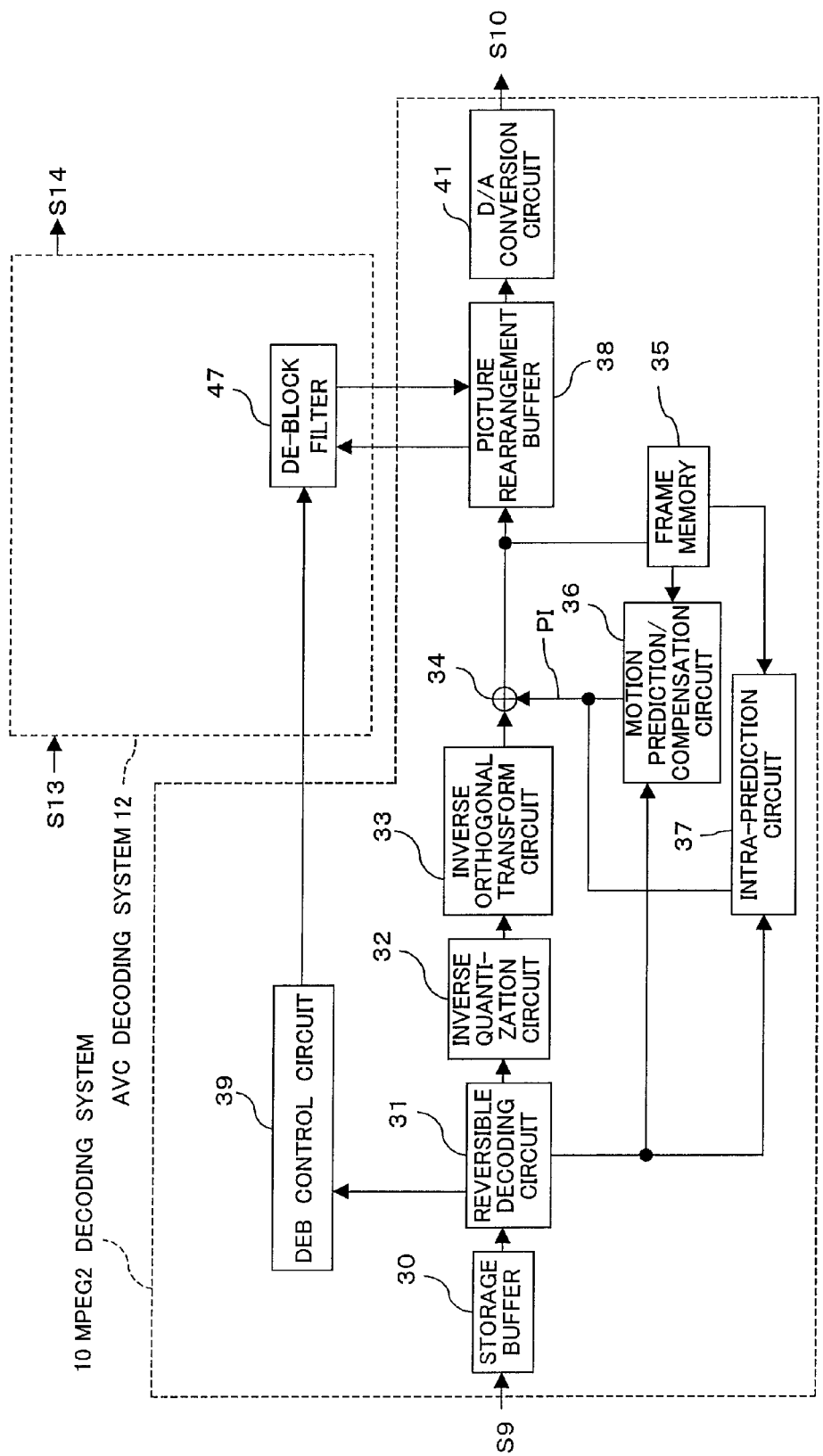
FIG. 2 is a functional block diagram of a decoding system shown in FIG. 1.

A DEB control circuit 39 shown in FIG. 2 is an example of the controlling unit or the controlling means of the present invention, and a de-block filter 47 is an example of the filtering unit or the filtering means of the present invention.

A macro block MB is an example of the block of the present invention, and an image data of macro block MB is an example of the block image data of the present invention.

Further, 4×4 (or 8×8) pixel block image data are one example of the sub-block image data of the present invention.

The quantization parameter QP of the present embodiment is an example of the quantization parameter of the present invention, and a block boundary strength data Bs is an example of the block boundary strength data of the present invention.

Figure 14:
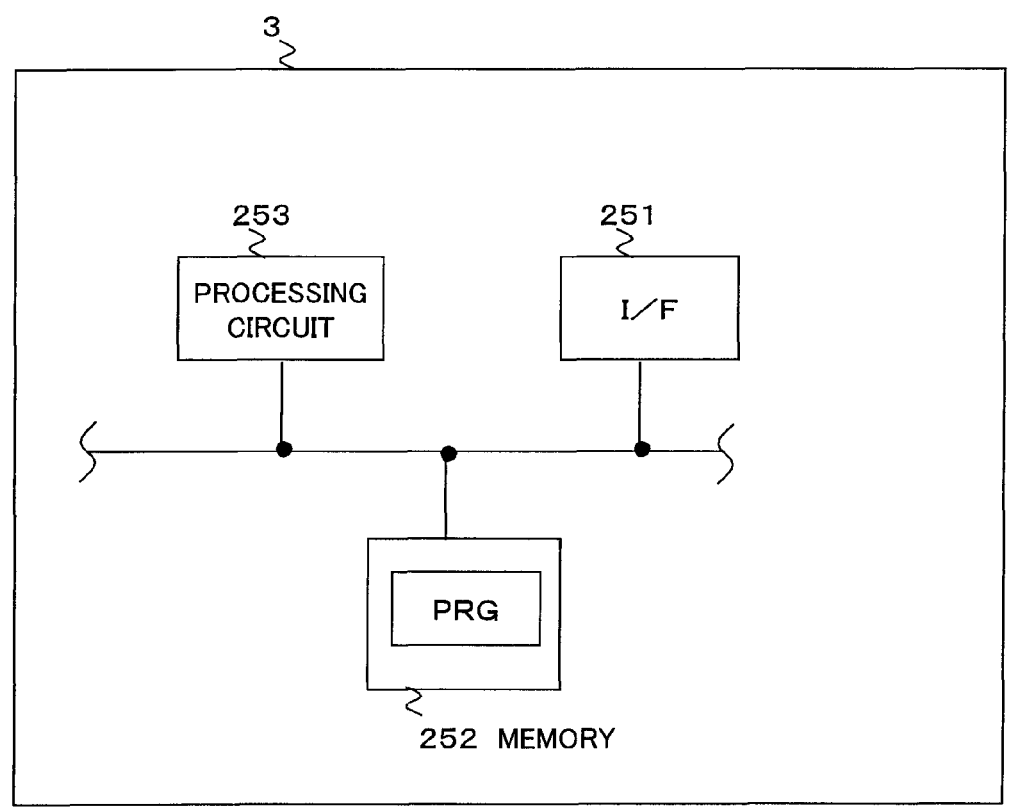
FIG. 14 is a diagram for explaining another modification of the decoding system shown in FIG. 2.

Further, a program PRG shown in FIG. 14 is an example of the program of the present invention, and a memory 252 is an example of the recording medium. The recording medium may be a semiconductor memory, an optical disk, an opto-magnetic disc or a magnetic disc etc.

Figure 1:
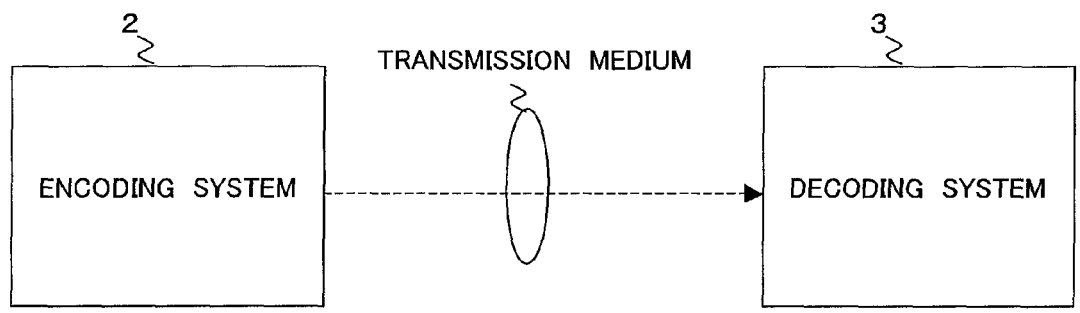
FIG. 1 is a view of the configuration of a communication system of an embodiment of the present invention.

FIG. 1 is a conceptual diagram of an image data communication system 1 of the present embodiment.

The image data communication system 1 has an encoding system 2 provided on a transmission side and a decoding system 3 provided on a reception side of a transmission medium or a transmission path 5.

In the image data communication system 1, the encoding system 2 on the transmission side generates frame image data (bit stream) compressed by an orthogonal transform such as a discrete cosine transform (DCT) or Karhunen-Loewe transform and motion compensation, modulates the frame image data, and then transmits the same via a transmission medium 5 such as an artificial satellite broadcast wave, cable TV network, telephone line network, and mobile phone line network.

In the reception side, the received image signal is demodulated at the decoding system 3 and then the frame image data extended by the inverse transform to the orthogonal transform at the time of the modulation described above and motion compensation is generated and utilized.

Note that the above transmission medium 5 may be a recording medium such as an optical disc, magnetic disc, and a semiconductor memory in addition to the transmission path.

Below, the decoding system 3 shown in FIG. 1 will be explained.

FIG. 2 is a view of the overall configuration of the decoding system 3 shown in FIG. 1.

The decoding system 3 has for example an MPEG2 decoding system 10 and AVC decoding system 12.

<MPEG2 Decoding System>

As shown in FIG. 2, the MPEG2 decoding system 10 has for example a storage buffer 30, reversible decoding circuit 31, inverse quantization circuit 32, inverse orthogonal transform circuit 33, adder circuit 34, frame memory 35, motion prediction/compensation circuit 36, intra-prediction circuit 37, picture rearrangement buffer 38, DEB control circuit 39, and D/A conversion circuit 41.

The DEB control circuit 39 processes a generation of the quantization parameter QP and a generation of the block boundary strength data Bs.

The storage buffer 30 has encoded image data S9 encoded by the MPEG scheme input (received) from the decoding system 3 written into it.

The reversible decoding circuit 31, when judging that the image data of macro block MB to be processed in the image data S9 is inter-encoded, decodes a motion vector written in its header and outputs the result to the motion prediction/compensation circuit 36.

The reversible decoding circuit 31, when judging that the image data in the macro block MB to be processed in the image data S9 is intra-encoded, decodes the intra-prediction mode information written in its header and outputs the result to the intra-prediction circuit 37.

Further, the reversible decoding circuit 31 decodes the encoded image data S9 and outputs the result to the inverse quantization circuit 32.

Further, the reversible decoding circuit 31 outputs a quantization scale Q_SCALE of each image data in macro block MB included in the encoded image data S9 and the MB (Macro Block) type to the DEB control circuit 39.

The inverse quantization circuit 32 inversely quantizes the image data (orthogonal transform coefficient) decoded at the reversible decoding circuit 31 based on the quantization scale Q_SCALE input from the reversible decoding circuit 31 and outputs the result to the inverse orthogonal transform circuit 33.

The inverse orthogonal transform circuit 33 applies 8×8 pixel unit inverse orthogonal transform processing to the image data (orthogonal transform coefficient) input from the inverse quantization circuit 32 to generate a differential image data and outputs this to the adder circuit 34.

The adder circuit 34 adds predictive image data PI from the motion prediction/compensation circuit 36 or the intra-prediction circuit 37 and the differential image data from the inverse orthogonal transform circuit 33 to generate the image data and writes this into the frame memory 35 and the picture rearrangement buffer 38.

The motion prediction/compensation circuit 36 generates the predictive image data PI based on the reference image data read out from the frame memory 35 and the motion vector input from the reversible decoding circuit 31 and outputs this to the adder circuit 34.

The intra-prediction circuit 37 generates the predictive image data PI based on the intra-prediction mode input from the reversible decoding circuit 31 and outputs this to the adder circuit 34.

Figure 3:
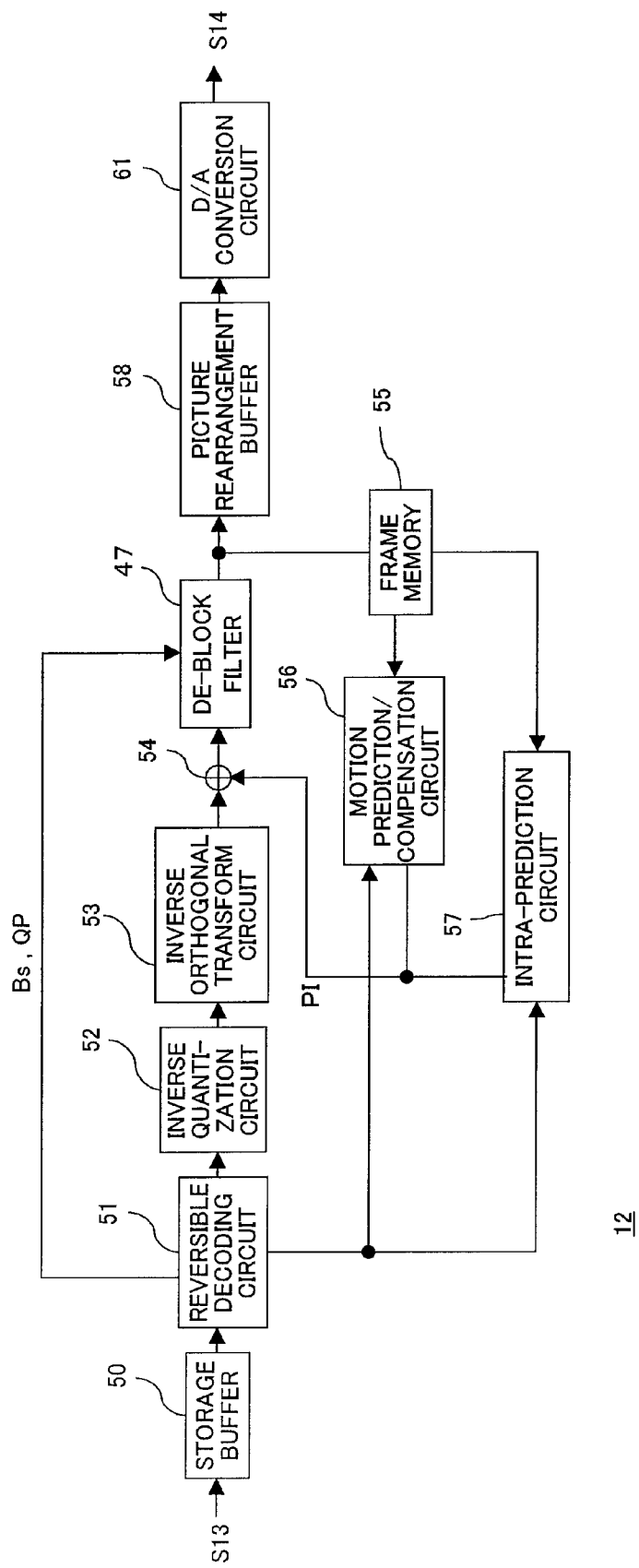
FIG. 3 is a functional block diagram of an AVC decoding system shown in FIG. 2.

The picture rearrangement buffer 38 reads out the decoded image data written from the adder circuit 34 to the D/A conversion circuit 41 in the order of display after the filtering by the de-block filter 53 of the AVC decoding system 12 shown in FIG. 2 and FIG. 3.

The DEB control circuit 39 generates the block boundary strength data Bs and the quantization parameter QP based on the quantization scale Q_SCALE of each image data in macro block MB input from the reversible decoding circuit 31 and the MB type and outputs these to the de-block filter 53 of the AVC decoding system 12.

The processing of the DEB control circuit 39 will be explained in detail later.

The D/A conversion circuit 41 applies D/A conversion to the image data input from the picture rearrangement buffer 38 to generate an image signal (data) S10 and outputs this outside of the decoding system 3.

<AVC Decoding System>

As shown in FIG. 3, the AVC decoding system 12 has for example a storage buffer 50, reversible decoding circuit 51, inverse quantization circuit 52, inverse orthogonal transform circuit 53, adder circuit 54, frame memory 55, motion prediction/compensation circuit 56, intra-prediction circuit 57, picture rearrangement buffer 58, D/A conversion circuit 61, and de-block filter 47.

The storage buffer 50 has the image data S13 encoded by the AVC scheme input (received) from the decoding system 3 written into it.

The reversible decoding circuit 51, when judging that the image data in the macro block MB to be processed in the image data S13 is inter-encoded, decodes the motion vector written in its header and outputs the result to the motion prediction/compensation circuit 56.

The reversible decoding circuit 51, when judging that the image data in the macro block MB to be processed in the image data S13 is intra-encoded, decodes the intra-prediction mode information written in its header and outputs the same to the intra-prediction circuit 57.

Further, the reversible decoding circuit 51 decodes the image data S13 and outputs the result to the inverse quantization circuit 52.

Further, the reversible decoding circuit 51 outputs the quantization parameter QP of each image data in the macro block MB included in the image data S13 and the block boundary strength data Bs to the de-block filter 47.

The inverse quantization circuit 52 inversely quantizes the image data (orthogonal transform coefficient) decoded at the reversible decoding circuit 51 based on the quantization parameter QP input from the reversible decoding circuit 31 and outputs the result to the inverse orthogonal transform circuit 53.

The inverse orthogonal transform circuit 53 applies the 4×4 pixel unit inverse orthogonal transform processing to the image data (orthogonal transform coefficient) input from the inverse quantization circuit 52 to generate the differential image data and outputs that to the adder circuit 54.

The adder circuit 54 adds the predictive image data PI from the motion prediction/compensation circuit 56 or the intra-prediction circuit 57 and the differential image data from the inverse orthogonal transform circuit 53 to generate the image data and outputs this to the de-block filter 47.

The de-block filter 47 applies de-block filtering to the image data input from the adder circuit 54 based on the quantization parameter QP and the block boundary strength data Bs input from the inverse quantization circuit 52 and writes the processed image data into the frame memory 55 and the picture rearrangement buffer 38.

The motion prediction/compensation circuit 56 generates the predictive image data PI based on the reference image data read out from the frame memory 55 and the motion vector input from the reversible decoding circuit 51 and outputs this to the adder circuit 54.

The intra-prediction circuit 57 generates the predictive image data PI based on the intra-prediction mode input from the reversible decoding circuit 51 and outputs this to the adder circuit 54.

The picture rearrangement buffer 58 reads out the decoded image data written from the de-block filter 47 to the D/A conversion circuit 61 in the order of display.

The D/A conversion circuit 61 applies D/A conversion processing to the image data input from the picture rearrangement buffer 58 to generate the image signal S14 and outputs this outside of the decoding system 3.

<De-Block Filter>

The de-block filter 47 applies filtering so as to reduce the block distortion included in the input image data.

Figure 4:
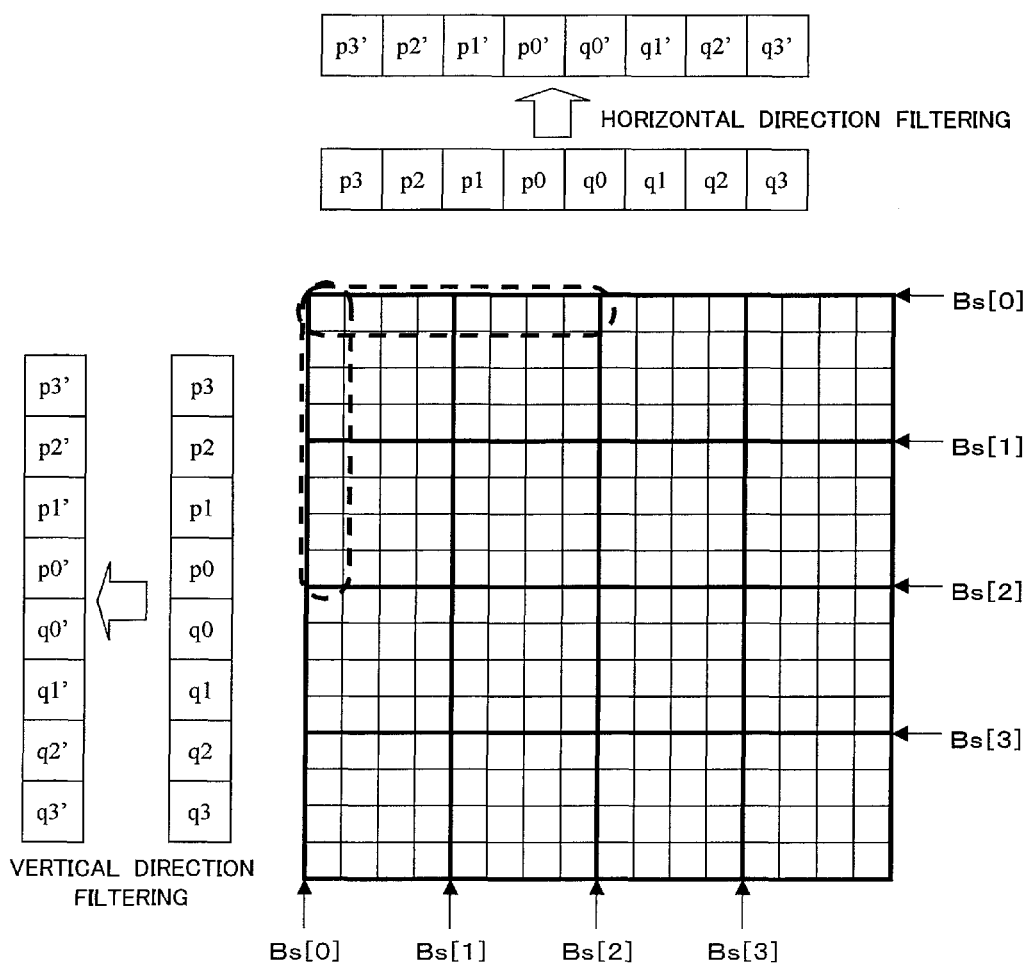
FIG. 4 is a diagram for explaining the processing of a de-block filter shown in FIG. 2 and FIG. 3.

Specifically, the de-block filter 47 performs filtering in a horizontal direction and a vertical direction in units of 4×4 block data in 16×16 macro blocks MB as shown in FIG. 4 based on the input quantization parameter QP and block boundary strength data Bs.

The block boundary strength data Bs is defined as shown in FIG. 5 by for example H.264/AVC.

The block boundary strength data Bs is assigned the highest filter strength "4", for example, as shown in FIG. 5, in a case where either the pixel data p or q belongs to intra-encoded image data in macro blocks MB and the pixel data is located at the boundary of the macro blocks MB.

Further, the block boundary strength data Bs is assigned the next highest filter strength to "4", that is, "3", for example, as shown in FIG. 5, in a case where either the pixel data p or q belongs to intra-encoded image data in macro blocks MB and the pixel data is not located at the boundary of the macro blocks MB.

Further, the block boundary strength data Bs is assigned the next highest filter strength to "3", that is, "2", for example, as shown in FIG. 5, in a case where neither the pixel data p nor q belongs to intra-encoded image data in macro blocks MB and either pixel data has a transform coefficient.

Further, the block boundary strength data Bs is assigned "1", for example, as shown in FIG. 5, in a case where the condition that neither the pixel data p nor q belongs to intra-encoded image data in macro blocks MB and neither pixel data has a transform coefficient is satisfied and any of the conditions that the reference frames are different, the numbers of reference frames are different, and the motion vectors are different is satisfied.

Further, the block boundary strength data Bs is assigned "0" meaning that the filtering is not carried out, for example, as shown in FIG. 5, in a case where neither the pixel data p nor q belongs to intra-encoded image data in macro blocks MB, none of the pixel data has a transform coefficient, and the reference frames and the motion vectors are the same.

Figure 6:
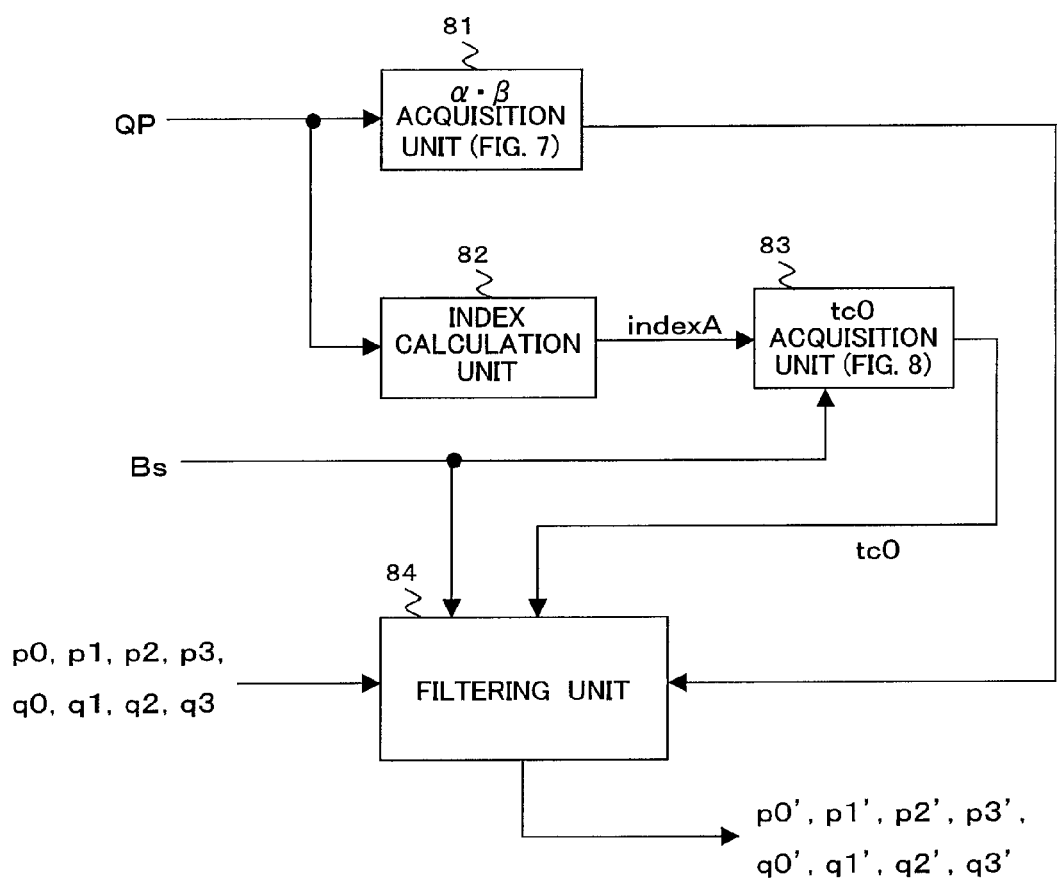
FIG. 6 is a functional block diagram of a DEB control circuit shown in FIG. 2.

FIG. 6 is a view of the configuration of the de-block filter 47.

As shown in FIG. 6, the de-block filter 47 has for example an α·β acquisition unit 81, index calculation unit 82, tc0 acquisition unit 83, and filtering unit 84.

The α·β acquisition unit 81 acquires the data (parameters) α and β with reference to table data TABLE1 shown in FIG. 7 using the input quantization parameter QP as a key.

Here, the parameters α and β are determined in value in accordance with the quantization parameter QP of each macro block as shown in FIG. 7 by default.

Note that the values of the parameters α and β can be adjusted by the user according to two parameters such as slice_alpha_c0_Offset_div2 and slice_beta_Offset_div2 included in the Slice header data in the image data (bit stream) to be decoded.

The index calculation unit 82 receives as input the quantization parameter QP of the adjacent macro blocks MB(P) and MB(Q) and calculates data indexes A and B according to the following Equation (1).

Note that, in the following Equation (1), FilterOffsetA and FilterOffsetB correspond to amounts of adjustment by the user.

In FIG. 6, qPp indicates the quantization parameter QP of the macro block MB(P), and qPq indicates the quantization parameter QP of the image data in macro block MB(Q).

[Equation 1]

$qPav = (qPp + qPq + 1) >> 1$ $indexA = Clip3(0, 51, qPav + FilterOffsetA)$ $indexB = Clip3(0, 51, qPav + FilterOffsetB)$ (1)

The tc0 acquisition unit 83 acquires the data tc0 based on the table data TABLE2 shown in FIG. 8 using the block boundary strength data Bs and the data indexA input from the index calculation unit 82 as the key and outputs this to the filtering unit 84.

The filtering unit 84 performs different filtering between a case of "Bs<4" and a case of "Bs=4" as shown below.

First, the case of "Bs<4" will be explained.

The filtering unit 84 performs the processing shown in the following Equation (2) to calculate the filtered pixel data p0' and q0'.

In the following Equation (2), Clip3 indicates the clipping.

[Equation 2]

$p0' = Clip1(p0 + \Delta)$ $q0' = Clip1(q0 + \Delta)$ $\Delta = Clip3(-tc, tc((((q0 - p0) << 2) + (p1 - q1) + 4) >> 3))$ (2)

The filtering unit 84 calculates the "tc" of the above Equation (2) based on the following Equation (3) when a flag chromaEdgeFlag indicates "0", while calculates the same based on the following Equation (4) in a case other than the above.

In the following Equation (3), "( )?1:0" indicates "1" when satisfying the condition in ( ) and indicates "0" in a case other than the above.

[Equation 3]

$tc = tc0 + ((ap < \beta)?1:0) + ((aq < \beta)?1:0)$ (3)

[Equation 4]

$tc = tc0 + 1$ (4)

Further, the filtering unit 84 calculates the ap and aq of the above Equation (3) according to the following Equation (5).

[Equation 5]

$ap = |p2 - p0|$ $aq = |q2 - q0|$ (5)

The filtering unit 84 performs the processing shown in the following Equation (6) to calculate the filtered pixel data p1' when chromaEdgeFlag is 0 and ap is β or less and acquires the same from the following Equation (7) in a case other than the above.

[Equation 6]

$$p1'=p1+\text{Clip3}(-tc0,tc0,(p2+((p0+q0+1)>>1)-(p1<<1))>>1) \quad (6)$$

[Equation 7]

$$p1'=p1 \quad (7)$$

The filtering unit 84 performs the processing shown in the following Equation (8) to calculate the filtered pixel data q1' when chromaEdgeFlag is 0 and aq is β or less and acquires the same from the following Equation (9) in a case other than the above.

[Equation 8]

$$q1'=q1+\text{Clip3}(-tc0,tc0,(q2+((p0+q0+1)>>1)-(q1<<1))>>1) \quad (8)$$

[Equation 9]

$$q1'=q1 \quad (9)$$

Next, the case where "Bs=4" will be explained.

The filtering unit 84 calculates the pixel data p0', p1', and p2' according to the following Equation (11) in the case where the flag chromaEdgeFlag indicates "0" and the condition of the following Equation (10) is satisfied.

[Equation 10]

$$ap<\beta \&\& |p0-q0|<((\alpha>>2)+2) \quad (10)$$

[Equation 11]

$$p0'=(p2+2 \cdot p1+2 \cdot p0+2 \cdot q0+q1+4)>>3$$

$$p1'=(p2+p1+p0+q0+2)>>2$$

$$p2'=(2 \cdot p3+3 \cdot p2+p1+p0+q0+4)>>3 \quad (11)$$

The filtering unit 84 calculates the pixel data p0', p1', and p2' according to the following Equation (12) in the case where the flag chromaEdgeFlag indicates "0" and the condition of the following Equation (10) is not satisfied.

[Equation 12]

$$p0'=(2 \cdot p1+p0+q1+2)>>2$$

$$p1'=p1$$

$$p2'=p2 \quad (12)$$

The filtering unit 84 calculates the pixel data q0', q1', and q2' in accordance with the following equation (14) in the case where the flag chromaEdgeFlag indicates "0" and the condition of the following Equation (13) is satisfied.

[Equation 13]

$$aq<\beta \&\& |p0-q0|<((\alpha>>2)+2) \quad (13)$$

[Equation 14]

$$q0'=(p1+2 \cdot p0+2 \cdot q0+2 \cdot q1+q2+4)>>3$$

$$q1'=(p0+q0+q1+q2+2)>>2$$

$$q2'=(2 \cdot q3+3 \cdot q2+q1+q0+p4+4)>>3 \quad (14)$$

The filtering unit 84 calculates the pixel data q0', q1', and q2' in accordance with the following equation (15) in the case where the flag chromaEdgeFlag indicates "0" and the condition of the following Equation (10) is not satisfied.

[Equation 15]

$$q0'=(2 \cdot q1+q0+p1+2)>>2$$

$$q1'=q1$$

$$q2'=q2 \quad (15)$$

[DEB Control Circuit]

Below, the processing of the DEB control circuit 39 shown in FIG. 2 will be explained in detail.

The DEB control circuit 39 performs processing for generation of the quantization parameter QP and processing for generation of the block boundary strength data Bs as shown below.

First, the processing for generation of the quantization parameter QP by the DEB control circuit 39 will be explained.

Figure 9:
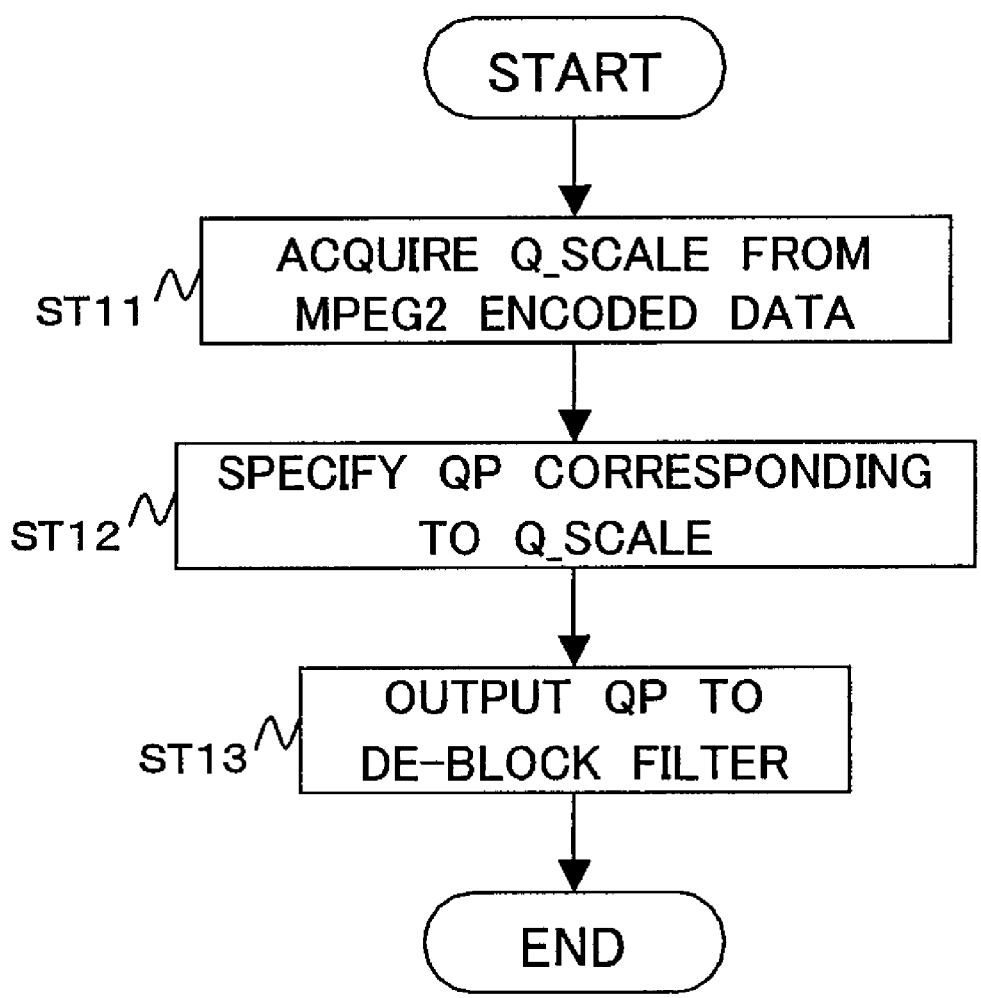
FIG. 9 is a flow chart for explaining the processing for generation of a quantization parameter QP performed by the DEB control circuit shown in FIG. 2.

FIG. 9 is a flow chart for explaining the processing for generation of the quantization parameter QP performed by the DEB control circuit 39 shown in FIG. 2.

Step ST11:

As previously explained, the DEB control circuit 39 receives as input the quantization scale Q_SCALE of each image data in macro block MB included in the MPEG2 scheme image data S9 from the reversible decoding circuit 39.

Step ST12:

The DEB control circuit 39 specifies the quantization parameter QP corresponding to the quantization scale Q_scale input at step ST11.

The following Equation (16) stands between the H.264/AVC quantization parameter QP (range: 0 to 31) and the MPEG2 quantization scale Q_SCALE.

[Equation 16]

$$Q\_SCALE=2^{20}/(676 \times A(QP)) \quad (16)$$

A(QP) in the above Equation (16) is defined as in the following Equation (17) for each of QP=0 to 31.

[Equation 17]

$$A(QP=0,\ldots,31)=[620,553,492,439,391,348,310,\\276,246,219,195,174,155,138,123,110,98,87,78,\\69,62,55,49,44,39,35,31,27,24,22,19,17] \quad (17)$$

From the above Equations (16) and (17), the relationships of the following Equation (18) stand.

[Equation 18]

$$Q\_SCALE(QP=0,\ldots,31)=[2.5019,2.8050,3.1527,\\3.5334,3.9671,4.4573,5.0037,5.6201,6.3055,\\7.0829,7.9546,8.9146,10.0074,11.2402,12.6110,\\14.1013,15.8280,17.8293,19.8865,22.4804,\\25.0185,28.2027,31.6561,35.2534,39.7730,\\44.3185,50.0370,57.4499,64.6312,70.5067,\\81.6394,91.2440] \quad (18)$$

The DEB control circuit 39 uses the table data defining the relationships shown in the above Equation (18) using the input quantization scale Q_SCALE as a key and acquires the quantization parameter QP corresponding to that.

Next, the range of the quantization parameter QP explained above is 0 to 31, and the range of the quantization parameter QP defined by H.264/AVC is 0 to 51, therefore a new quantization parameter QP is calculated according to the following Equation (19). This is output to the de-block filter 47.

[Equation 19]

$$QP = QP + 12 \quad (19)$$

Next, the processing for generation of the block boundary strength data Bs by the DEB control circuit 39 will be explained.

Figure 10:
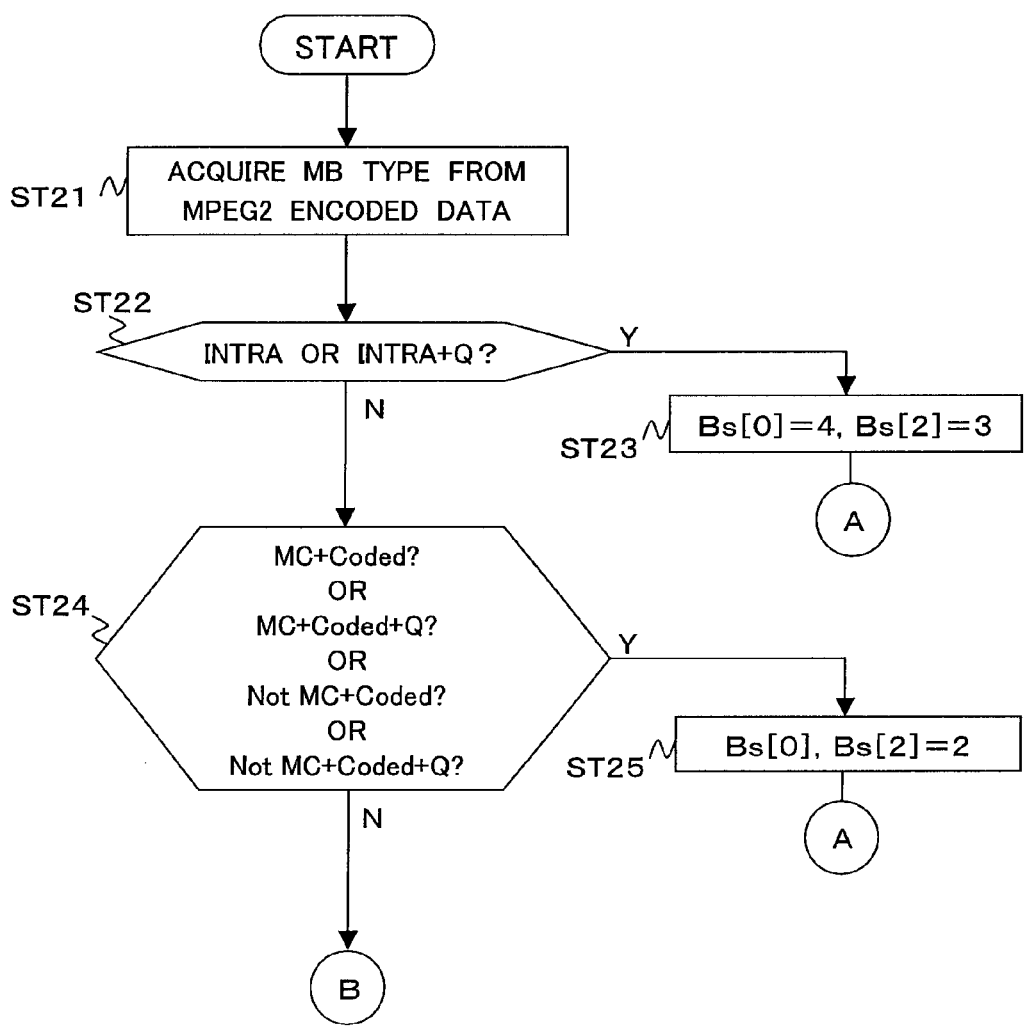
FIG. 10 is a flow chart for explaining the processing for generation of block boundary strength data Bs by the DEB control circuit shown in FIG. 2.
Figure 11:
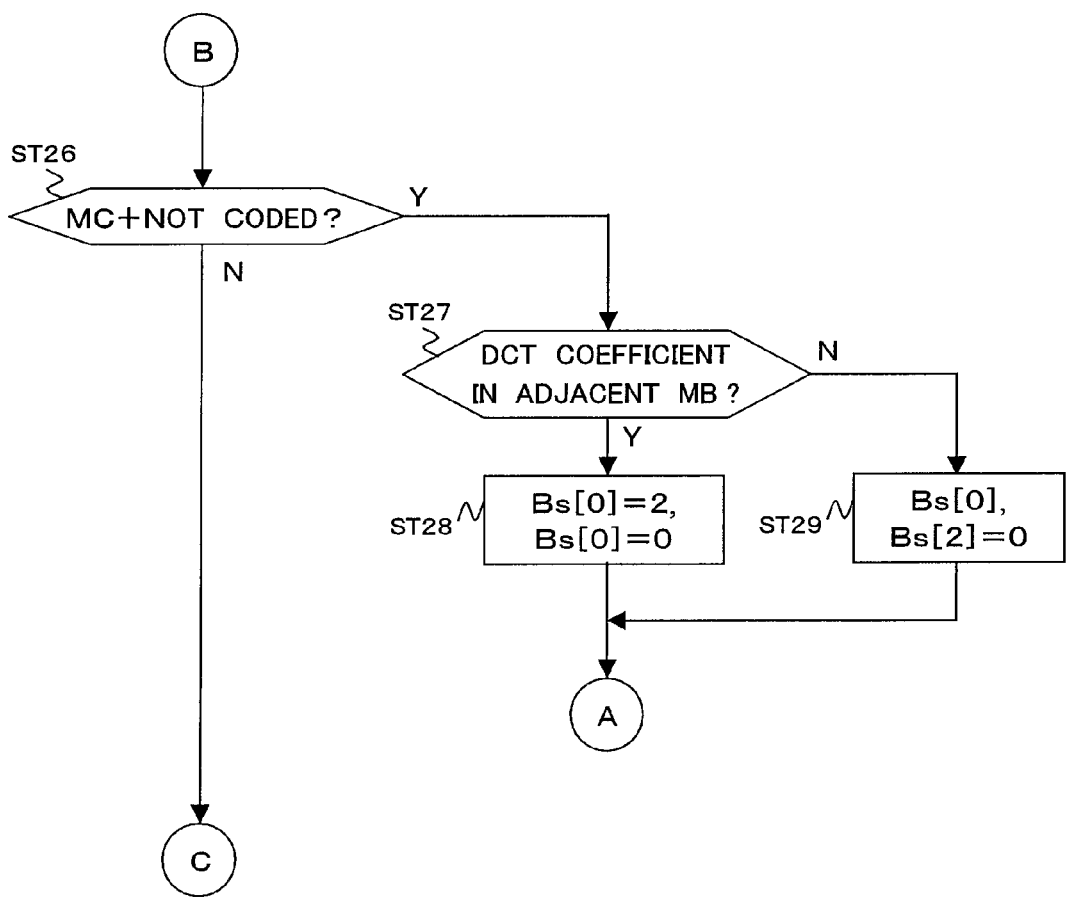
FIG. 11 is a flow chart continuing from FIG. 10 for explaining the processing for generation of block boundary strength data Bs by the DEB control circuit shown in FIG. 2.
Figure 12:
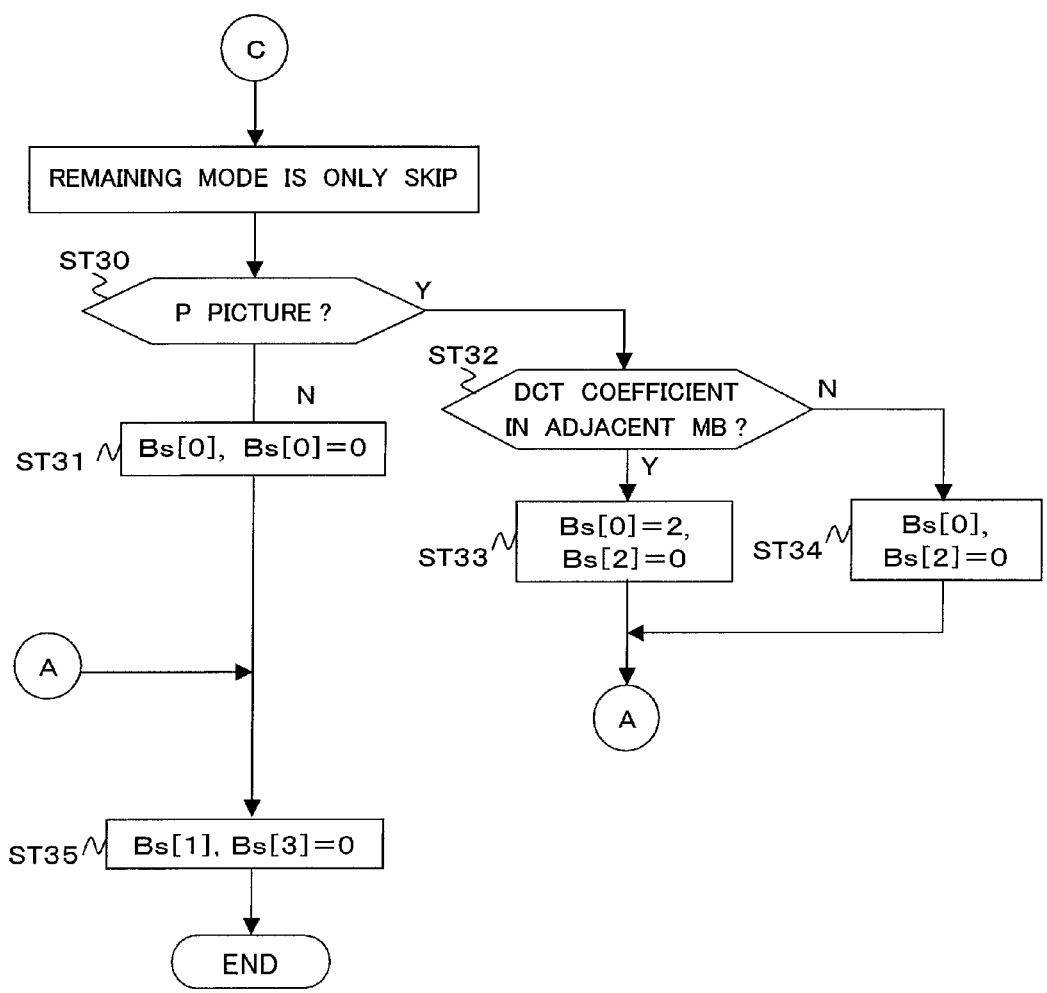
FIG. 12 is a flow chart continuing from FIG. 11 for explaining the processing for generation of block boundary strength data Bs by the DEB control circuit shown in FIG. 2.

FIG. 10 to FIG. 12 are flow charts for explaining the processing for generation of the block boundary strength data Bs by the DEB control circuit 39.

Step ST21:

The DEB control circuit 39 receives as input the MB type (MB type designation data) of the image data in macro block MB to be processed of the MPEG scheme image data S9 from the reversible decoding circuit 31.

Step ST22:

The DEB control circuit 39 proceeds to step ST23 when judging that the MB type input at step ST21 is "Intra" or "Intra+Q", while proceeds to step ST24 when not judging so.

Here, "Intra" indicates that the image data in macro block MB is intra-encoded.

Further, "Intra+Q" indicates that the image data in macro block MB is intra-encoded, and there is a quantization updating step.

"Intra" and "Intra+Q" of MPEG2 correspond to "Intra" of the H.264/AVC.

Step ST23:

The DEB control circuit 39 sets "4" for the block boundary strength data Bs "0" and sets "3" for the block boundary strength data Bs "2".

Thereafter, the DEB control circuit 39 proceeds to step ST35 shown in FIG. 12.

Step ST24:

The DEB control circuit 39 proceeds to step ST25 when judging that the MB type input at step ST21 is "MC+Coded", "MC+Coded+Q", "NotMC+Coded", or "NotMC+Coded+Q", while proceeds to step ST26 when not judging so.

Here, "MC+Coded" means that the inter-prediction coding (motion prediction/compensation) is required, that is, inter-prediction coding was carried out. "MC+Coded+Q" means that the inter-prediction coding was carried out and conversion of the quantization value was carried out.

"NotMC+Coded" means that motion compensation was not carried out, but only decoding of the DCT coefficient was carried out. "NotMC+Coded" means that motion compensation was not carried out, but conversion of the quantization value was carried out.

"MC+Coded" and "MC+Coded+Q" of MPEG2 correspond to "Inter16×16" of H.264/AVC.

"NotMC+Coded" and "NotMC+Coded+Q" correspond to "Direct16×16" of H.264/AVC.

Step ST25:

The DEB control circuit 39 sets "2" for the block boundary strength data Bs "0" and Bs "2".

Thereafter, the DEB control circuit 39 proceeds to step ST35 shown in FIG. 12.

Step ST26:

The DEB control circuit 39 proceeds to step ST27 when judging that the MB type input at step ST21 is "MC+Not Coded", while proceeds to step ST30 when not judging so.

Here, "MC+Not Coded" means that motion compensation is carried out, but the decoding of the DCT coefficient is not carried out.

"MC+Not Coded" of MPEG2 corresponds to "Inter16×16" of H.264/AVC.

Step ST27:

The DEB control circuit 39 proceeds to step ST28 when judging that the image data in the macro block MB adjacent to the image data in the macro block MB to be processed has a valid orthogonal transform coefficient (DCT coefficient), while proceeds to step ST29 when not judging so.

Step ST28:

The DEB control circuit 39 sets "2" for the block boundary strength data Bs "0".

At this time, the DEB control circuit 39 sets "0" for the block boundary strength data Bs "2".

Thereafter, the DEB control circuit 39 proceeds to step ST35 shown in FIG. 12.

Step ST29:

The DEB control circuit 39 sets "0" for the block boundary strength data Bs "0" and Bs "2".

Thereafter, the DEB control circuit 39 proceeds to step ST35 shown in FIG. 12.

Step ST30:

When step ST30 is reached, the MB type is "Skip".

Here, "Skip" means that the motion vector is not encoded.

In MPEG2, the processing is different according to a P picture or a B picture.

"Skip" of MPEG2 in a P picture corresponds to "Temporal Direct16×16" of H.264/AVC.

"Skip" of MPEG2 in a B picture corresponds to "Spatial Direct16×16" of H.264/AVC.

The DEB control circuit 39 proceeds to step ST31 when judging that the present picture type is a P picture, while proceeds to step ST32 when not judging so.

Step ST31:

The DEB control circuit 39 sets "0" for the block boundary strength data Bs "0" and Bs "2".

Thereafter, the DEB control circuit 39 proceeds to step ST35 shown in FIG. 12.

Step ST32:

The DEB control circuit 39 proceeds to step ST33 when judging that the image data in the macro block MB adjacent to the image data in the macro block MB to be processed has a valid orthogonal transform coefficient (DCT coefficient), while proceeds to step ST34 when not judging so.

Step ST33:

The DEB control circuit 39 sets "2" for the block boundary strength data Bs "0".

At this time, the DEB control circuit 39 sets "0" for the block boundary strength data Bs "2".

Thereafter, the DEB control circuit 39 proceeds to step ST35 shown in FIG. 12.

Step ST34:

The DEB control circuit 39 sets "0" for the block boundary strength data Bs "0" and Bs "2".

Thereafter, the DEB control circuit 39 proceeds to step ST35 shown in FIG. 12.

Step ST35:

The DEB control circuit 39 sets "0" for the block boundary strength data Bs "1" and "3".

Below, an example of the operation of the decoding system 3 shown in FIG. 2 will be explained.

Here, a case where MPEG2 scheme encoded image data S9 is decoded will be explained.

The encoded image data S9 is stored in the storage buffer 30, and then output to the reversible decoding circuit 31.

Next, when judging that the image data in the macro block MB to be processed in the image data S9 is inter-encoded, the reversible decoding circuit 31 decodes the motion vector written in its header and outputs the result to the motion prediction/compensation circuit 36.

Further, when judging that the image data in the macro block MB to be processed in the image data S9 is intra-encoded, the reversible decoding circuit 31 decodes the intra-prediction mode information written in its header and outputs the result to the intra-prediction circuit 37.

Further, the reversible decoding circuit 31 decodes the image data S9 and outputs the result to the inverse quantization circuit 32.

Further, the reversible decoding circuit 31 outputs the quantization scale Q_SCALE of each image data in macro block MB included in the image data S9 and the MB type to the DEB control circuit 39.

Next, the inverse quantization circuit 32 inversely quantizes the image data (orthogonal transform coefficient) decoded at the reversible decoding circuit 31 based on the quantization scale Q_SCALE input from the reversible decoding circuit 31 and outputs the result to the inverse orthogonal transform circuit 33.

Next, the inverse orthogonal transform circuit 33 applies the 8×8-pixel unit inverse orthogonal transform processing to the image data (orthogonal transform coefficient) input from the inverse quantization circuit 33 to generate the differential image data and outputs that to the adder circuit 34.

Next, the adder circuit 34 adds the predictive image data PI from the motion prediction/compensation circuit 36 or the intra-prediction circuit 37 and the differential image data from the inverse orthogonal transform circuit 33 to generate the image data and writes this into the frame memory 35 and the picture rearrangement buffer 38.

In parallel to the above processing, the DEB control circuit 39 performs the processing shown in FIG. 9 and outputs the quantization parameter QP to the de-block filter 47.

Further, the DEB control circuit 39 performs the processing shown in FIG. 10 to FIG. 12 and outputs the block boundary strength data Bs to the de-block filter 47.

Then, the de-block filter 47 applies the de-block filtering to the image data stored in the picture rearrangement buffer 38 based on the quantization parameter QP and the block boundary strength data Bs input from the DEB control circuit 39.

Thereafter, the image data is read out to the reversible decoding circuit 31 in the sequence of display and converted to the image signal S10.

On the other hand, when the H.264/AVC scheme encoded image data S13 is decoded, the AVC decoding system 12 decodes the image data S13 in the same way as the general AVC decoding system and outputs the image signal S14.

As explained above, according to the decoding system 3, the de-block filtering by the de-block filter 47 can be applied to the MPEG2 scheme encoded image data S9, so the decoded high quality image signal S10 having the block distortion suppressed can be generated.

Further, according to the decoding system 3, the de-block filter 47 of the AVC decoding system 12 is utilized in the MPEG2 decoding system 10, therefore an increase in size of the system can be avoided.

Second Embodiment

In the present embodiment, the MPEG2 decoding system 10 performs the following processing when the input image data S9 is an interlace signal.

In the MPEG2, for an interlace signal, field prediction and dual prime prediction are used in addition to the frame prediction, while for a residual signal, a frame DCT and a field DCT are used. Due to this, block distortion different from the frame signal may appear.

Figure 13:
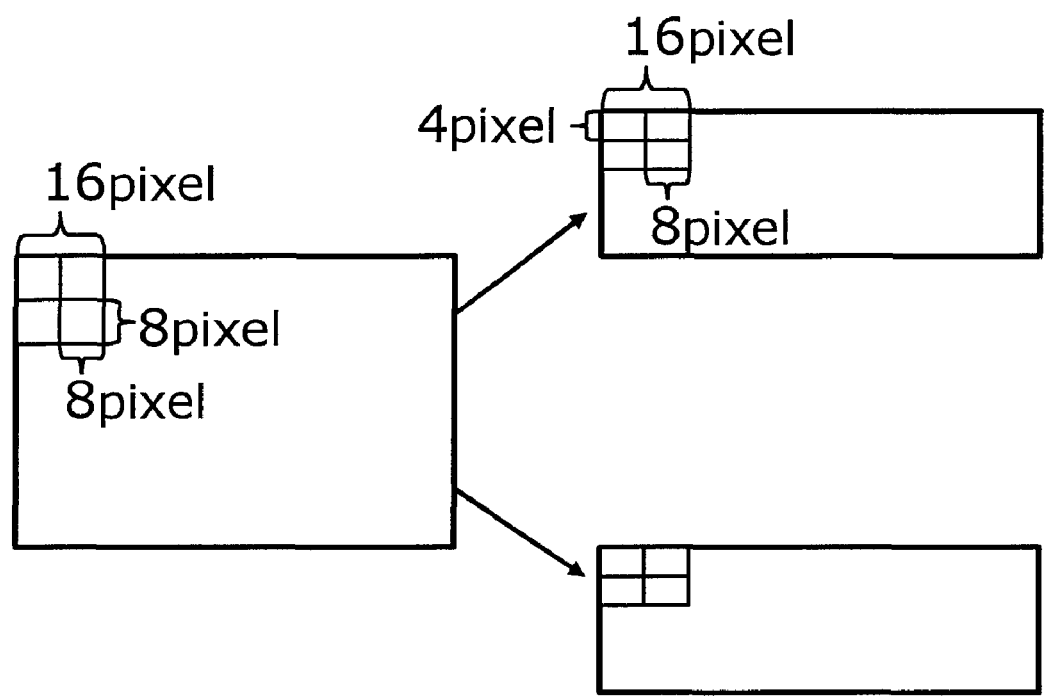
FIG. 13 is a diagram for explaining a first modification of the decoding system shown in FIG. 2.

When the DCT processing is carried out with the field signal in the encoding system and the image data in the macro block MB to be processed of the image data S9 has a frame structure, as shown in FIG. 13, the MPEG2 decoding system 10 transforms the image data S9 to the field structure, then performs the de-block filtering. Here, the image data in the macro block MB to be processed is converted to a field structure and becomes a block consisting of 16×8 pixels.

Then, the DEB control circuit 39 of the MPEG2 decoding system 10 sets the same value as the block boundary strength data Bs "0" and "2" explained in the first embodiment for the block boundary strength data Bs "1" and "3".

Due to this, the de-block filtering can be applied using a block actually subjected to the DCT processing as a reference.

Third Embodiment

In the present embodiment, the method of setting the block boundary strength data Bs according to the difference of DCT type will be explained.

In the MPEG2, the frame DCT and field DCT can be selected for each macro block MB.

Here, where two image date in macro blocks MB adjacent in the horizontal direction are different DCT types, the possibility of occurrence of block distortion is high. In general, an encoding system of the MPEG2 selects a frame DCT for parts with a high time correlation and selects a field DCT for parts where motion occurs between fields. This is because it is predicted that image date in adjacent macro blocks MB will differ in the properties of the image.

For this reason, in the present modification, the DEB control circuit 39 sets for example "3" for the block boundary strength data Bs "0" in the horizontal direction when the DCT type is different between the image date in the macro block MB to be de-block filtered and the image date in the macro block MB adjacent to that in the horizontal direction. Namely, the DEB control circuit 39 performs control so as to apply a strong de-block filtering to the boundary portion in the case where the DCT type is different between the image date in the macro block MB to be de-block filtered and the image date in the macro block MB adjacent to that in the horizontal direction in comparison with the case where the DCT types are the same.

The present invention is not limited to the above embodiments.

Namely, it should be understood by those skilled in the art that various modifications, combinations, sub-combinations and alterations may occur depending on design requirements and other factors insofar as they are within the scope of the appended claims or the equivalents thereof.

For example, all or part of the functions of the decoding system 3 explained above can be executed by a processing circuit 253 such as a CPU (Central Processing Unit) according to the programming of the program PRG stored in a memory 252 as shown in FIG. 13.

In this case, an interface 251 is used for the input of the image data to be decoded and the output of the processing result thereof.

Further, in the above example, the case using MPEG-2 as the input was explained, but the present invention is not limited to this in scope. The present invention can also be applied to a general image encoding scheme represented by JPEG, MPEG, and H.26x utilizing an orthogonal transform such as a discrete cosine transform.

The invention claimed is:

1. An image processing system for decoding an encoded image data having a plurality of block encoded image data which are generated from a plurality of block image data by encoding types defined in the respective block image data, said image processing system comprising:
   a controlling unit configured to select a filtering content to be applied to the block image data based on said encoding types of the block image data to be filtered; and
   a filtering unit configured to apply filtering to said block image data to be processed according to said filtering content selected by said controlling unit.

2. An image processing system as set forth in claim 1, wherein:
   said controlling unit generates a block boundary strength data indicating a filter strength in boundary portions of a plurality of sub-block image data composing said block image data to be processed based on said encoding type, and
   said filtering unit applies the filtering to the boundary portions of said plurality of sub-block image data with the filter strength indicated by said block boundary strength data generated by said controlling unit.

3. An image processing system as set forth in claim 2, wherein:
   said controlling unit generates said block boundary strength data indicating a stronger filter strength than that in a case of inter-encoding when the encoding type of said block image data to be processed is intra-encoding.

4. An image processing system as set forth in claim 2, wherein:
   said encoded image data comprises an image data generated by an orthogonal transform in units of said plurality of sub-block image data, and
   said controlling unit generates said block boundary strength data so as to apply stronger filtering than that in the boundary portions of said units of orthogonal transform to the boundary portions of said units of orthogonal transform among boundary portions of said sub-block image data.

5. An image processing system as set forth in claim 2, wherein:
   said filtering unit performs the filtering of the encoded image data generated by the orthogonal transform in units of single sub-block image data with the filter strength indicated by the block boundary strength data linked with said block image data to be processed.

6. An image processing system as set forth in claim 1, wherein:
   said encoding type indicates at least one of intra-prediction coding, inter-prediction coding, skipping, and presence of quantization step updating.

7. An image processing system as set forth in claim 1, wherein:
   said controlling unit converts a quantization scale of said block image data to a quantization parameter and outputs the quantization parameter to said filtering unit, and
   said filtering unit further performs said filtering based on said quantization parameter input from said controlling unit.

8. An image processing system as set forth in claim 2, wherein:
   said system further comprises a converting unit configured to convert the encoded image data to be processed to a picture structure when the encoded image data is generated, and
   said controlling unit generates said block boundary strength data in accordance with the boundary portions of said sub-block image data after said conversion by said converting unit.

9. An image processing system as set forth in claim 2, wherein:
   when said block image data is orthogonally transformed at the time of the encoding,
   said controlling unit generates said block boundary strength data so as to make said filter strength of the boundary portion of two block image data stronger in a case where a type of said orthogonal transform of said block image data to be processed and a type of said orthogonal transform of the block image data adjacent to the block data to be processed are different in comparison with a case where these types are the same.

10. An image processing system for decoding an encoded image data having a plurality of block encoded image data which are generated from a plurality of block image data by encoding types defined in the respective block image data, said image processing system comprising:
    a reversible decoding circuit configured to reversibly decode the block image data of the encoded image data to be decoded;
    an inverse quantization circuit configured to inversely quantize the block image data reversibly decoded by said reversible decoding circuit;
    an inverse orthogonal transform circuit configured to inversely orthogonal transform the block image data inversely quantized by said inverse quantization circuit;
    an adder circuit configured to generate reconfigured image data based on the block image data generated by said inverse orthogonal transform circuit and predictive image data;
    a controlling unit configured to select a filtering content to be applied to the block image data based on said encoding type of said block image data to be processed; and
    a filtering unit configured to apply filtering to the reconfigured image data generated by said adder circuit according to said filtering content selected by said controlling unit.

11. An image processing method, performed by a processor, of decoding an encoded image data having a plurality of block encoded image data which are generated from a plurality of block image data by encoding types defined in the respective block image data, said image processing method including:
    selecting a filtering content to be applied to the block image data based on said encoding type of the block image data to be filtered; and
    applying filtering to said block image data to be processed according to said filtering content selected in said selecting.

12. The image processing method as set forth in claim 11 further comprising:
    generating a block boundary strength data indicating a filter strength in boundary portions of a plurality of sub-block image data composing said block image data to be processed based on said encoding type; and
    applying filtering to the boundary portions of said plurality of sub-block image data with the filter strength indicated by said generated block boundary strength data.

13. The image processing method as set forth in claim 12 further comprising:
    generating said block boundary strength data indicating a stronger filter strength than that in a case of inter-encoding when the encoding type of said block image data to be processed is intra-encoding.

14. The image processing method as set forth in claim 12 wherein:

said encoded image data comprises an image data generated by an orthogonal transform in units of said plurality of sub-block image data, and said image processing method further comprises generating said block boundary strength so as to apply stronger filtering than that in the boundary portions of said units of orthogonal transform to the boundary portions of said units of orthogonal transform among boundary portions of said sub-block image data.

15. The image processing method as set forth in claim 12 further comprising:

filtering of the encoded image data generated by the orthogonal transform in units of single sub-block image data with the filter strength indicated by the block boundary strength data linked with said block image data to be processed.

16. The image processing method as set forth in claim 11 wherein:

said encoding type indicates at least one of intra-prediction coding, inter-prediction coding, skipping, and presence of quantization step updating.

17. The image processing method as set forth in claim 11 further comprising:

converting a quantization scale of said block image data to a quantization parameter; and filtering based on said quantization parameter.

18. An image processing system for decoding an encoded image data having a plurality of block encoded image data which are generated from a plurality of block image data by encoding types defined in the respective block image data, said image processing system including:

a controlling means for selecting a filtering content to be applied to the block image data based on the encoding types of the block image data to be filtered; and a filtering means for applying filtering to the block image data to be processed according to the filtering content selected by the controlling means.

19. An image processing system for decoding an encoded image data having a plurality of block encoded image data which are generated from a plurality of block image data by encoding types defined in the respective block image data, said image processing system including:

a reversible decoding means for reversibly decoding the block image data of the encoded image data to be decoded;

an inverse quantization means for inversely quantizing the block image data reversibly decoded by the reversible decoding means;

an inverse orthogonal transform means for inversely orthogonal transforming the block image data inversely quantized by the inverse quantization means;

an adder means for generating reconfigured image data based on the block image data generated by the inverse orthogonal transform means and predictive image data;

a controlling means for selecting a filtering content to be applied to the block image data based on the encoding type of the block image data to be processed; and a filtering means for applying filtering to the reconfigured image data generated by the adder means according to the filtering content selected by the controlling means.

20. A computer readable medium storing a program to be run by a computer for decoding an encoded image data generated from a plurality of block image data by encoding types defined in the respective block image data, said program making the computer execute:

a first routine of selecting a filtering content to be applied to the block image data based on the encoding type of the block image data to be filtered; and a second routine of applying filtering to the block image data to be processed according to the filtering content selected in the first routine.

* * * * *